(12) United States Patent
Lee

(10) Patent No.: US 7,181,429 B1
(45) Date of Patent: Feb. 20, 2007

(54) APPARATUS AND METHOD FOR STORING ELECTRONIC MONEY

(75) Inventor: Tong Hyong Lee, Pusan (KR)

(73) Assignee: Booil Mobil Telecomm. Corp., Pusan (KR)

( * ) Notice: Subject to any disclaimer, the term of this patent is extended or adjusted under 35 U.S.C. 154(b) by 0 days.

(21) Appl. No.: 09/299,596

(22) Filed: Apr. 27, 1999

(51) Int. Cl.
*G06G 40/00* (2006.01)

(52) U.S. Cl. .......................... 705/41; 705/35; 705/39; 705/42; 235/379

(58) Field of Classification Search .................. 705/35, 705/39, 41, 42, 44, 40, 43, 38; 455/406–408; 235/379
See application file for complete search history.

(56) References Cited

U.S. PATENT DOCUMENTS

| | | | |
|---|---|---|---|
| 6,105,006 A * | 8/2000 | Davis et al. | 705/35 |
| 6,311,167 B1 * | 10/2001 | Davis et al. | 705/35 |
| 6,446,049 B1 * | 9/2002 | Janning et al. | 705/40 |
| 6,466,783 B2 * | 10/2002 | Dahm et al. | 455/414.2 |
| 6,536,661 B1 * | 3/2003 | Takami et al. | 235/379 |

FOREIGN PATENT DOCUMENTS

| | | |
|---|---|---|
| JP | 08-087655 A | 4/1996 |
| JP | 10-091740 A | 4/1998 |
| JP | 11-272758 | 8/1999 |
| JP | 2000-076399 A | 3/2000 |
| KR | 97-0007003 | 11/1993 |
| KR | 10-0228021 | 8/1999 |
| KR | 10-0275419 | 9/2000 |
| WO | WO92/11598 | 7/1992 |

* cited by examiner

*Primary Examiner*—Hani M. Kazimi
*Assistant Examiner*—Stefano Karmis
(74) *Attorney, Agent, or Firm*—Birch, Stewart, Kolasch & Birch, LLP

(57) ABSTRACT

An apparatus and method for storing an electronic money are disclosed. The apparatus includes a portable terminal having an integrally formed electronic money card which is capable of storing a balance of the same using a radio communication or a storing unit for thereby overcoming the aforementioned problems encountered in the background art and storing a balance of an electronic money card by integrally engaging a portable terminal and a restorable electronic money card.

20 Claims, 9 Drawing Sheets

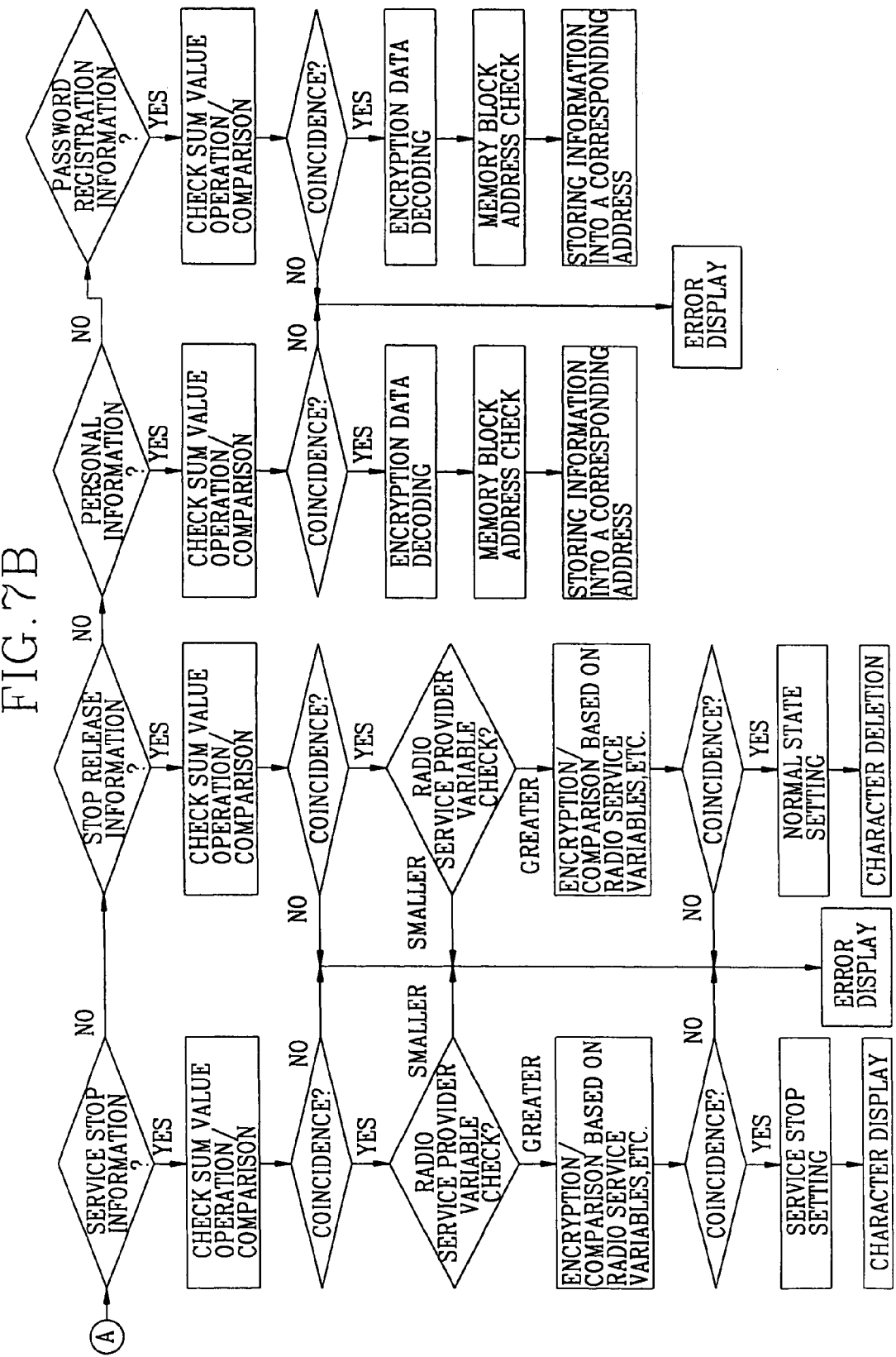

APPARATUS AND METHOD FOR STORING ELECTRONIC MONEY

BACKGROUND OF THE INVENTION

1. Field of the Invention

The present invention relates to a portable terminal, and in particular to an apparatus and method for storing an electronic money which are implemented based on a radio transmission method.

2. Description of the Background Art

As the industry is advanced, the use of an electronic money card is increased.

As a payment means, there is known a payment service system in which a payment is implemented using an electronic money card without using cash.

The above-described card is called as a non-contact radio recognition card, and a communication between a card reader or a charging unit and a card is implemented using an amplitude modulation.

A RF(Radio Frequency) chip is installed in the above-described card and is used as a money storing and traffic fare payment means.

With the above-described electronic money card, it is possible to prevent any inconvenience for buying a certain ticket when using a pubic traffic system and to decrease the time. In addition, it is possible to decrease any inconvenience when giving and receiving changes.

In the conventional art, in order to store a balance of an electronic money card, a user must go to an electronic money balance storing center. In this case, much inconvenience is caused to the user. If an electronic money card is lost, a financial loss is caused to the user.

In addition, it is impossible to check the remaining amount of money stored in an electronic money card because the remaining amount of money is not indicated on an electronic money card.

SUMMARY OF THE INVENTION

Accordingly, it is an object of the present invention to provide an apparatus and method for storing an electronic money which overcome the aforementioned problems encountered in the background art and are capable of storing a balance of an electronic money card by integrally engaging a portable terminal and a restorable electronic money card.

It is another object of the present invention to provide an apparatus and method for storing an electronic money which are capable of setting an invalidation of an electronic money card based on a radio signal transmitted when the electronic money card is lost and overcoming the invalidated state of the same when the lost card is found.

It is another object of the present invention to provide an apparatus and method for storing an electronic money which are changing a personal information based on a radio signal.

To achieve the above objects, there is provided an apparatus and method for storing an electronic money which are implemented based on the case that a radio communication service provider provides a service information such as an electronic money storage, a stored money cancellation, a service stop, a service stop release, a personal information update, etc.

To achieve the above objects, there is provided an apparatus and method for storing an electronic money which are capable of storing an electronic money into an electronic money card based on a radio transmission method or a non-contact method and are implemented by an integrated electronic money card and portable terminal.

To achieve the above objects, there is provided an apparatus for storing an electronic money which includes a portable terminal having an integrally formed electronic money card which is capable of storing a balance of the same using a radio communication or a storing unit.

To achieve the above objects, there is provided an apparatus for storing an electronic money which includes a radio signal receiving block for receiving a radio signal and judging whether the receives signal corresponds to a general information or a balance storing information, a memory block for storing a storing amount, a content and a certification information, a computation logic block for storing a balance storing data extracted from the balance storing information into the memory block when a balance storing information transmitted from the radio signal receiving block is a proper signal, and a non-contact block for storing a balance storing amount into the memory block using a card storing unit and reading a balance storing amount of the memory block when paying the money.

To achieve the above objects, there is provided an apparatus for storing an electronic money which includes a radio signal receiving block for receiving a radio signal, judging whether the received radio signal corresponds to a general information or a balance storing information, a memory block for storing a storing amount, a content, and a certification information, a modulation and demodulation unit for implementing a signal transmitting and receiving operation with a card storing unit, and a computation logic block for storing a balance storing data into the memory block when various certification information extracted from a balance storing information transmitted from the radio signal receiving block during the balance storing operation are judged as a proper information, storing the balance storing data of the modulation and demodulation unit into the memory block and reading the amount data as much as the amount confirmed by the modulation and demodulation unit during the payment operation from the memory block and paying via the modulation and demodulation unit.

To achieve the above objects, there is provided an a method for storing an electronic money which includes a first step for judging whether a received radio signal corresponds to a balance storing information, a second step for extracting various certification information in the case of the balance storing information, and judging whether a subscriber is a proper subscriber, and a third step for storing the amount data extracted from the balance storing information in the case of the proper subscriber.

To achieve the above objects, there is provided an a method for storing an electronic money which includes a first step for judging whether a card service stop or release information is received in the case that there is not a balance storing information, a second step for extracting a certification information and comparing whether the extracted information is coincided with the previously stored certification information when judging the card service stop or release information, and a third step for releasing a card service stop when the certification information is coincided.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 7A and 7B are flow charts illustrating a method for storing an electronic money according to a third embodiment of the present invention.

DETAILED DESCRIPTION OF THE PREFERRED EMBODIMENTS

The embodiments of the present invention will be explained with reference to the accompanying drawings.

Generally, in the present invention, a portable terminal represents a handphone, a PDA, a pager device, etc. In the present invention, the portable terminal represents a pager device.

Figure 1:
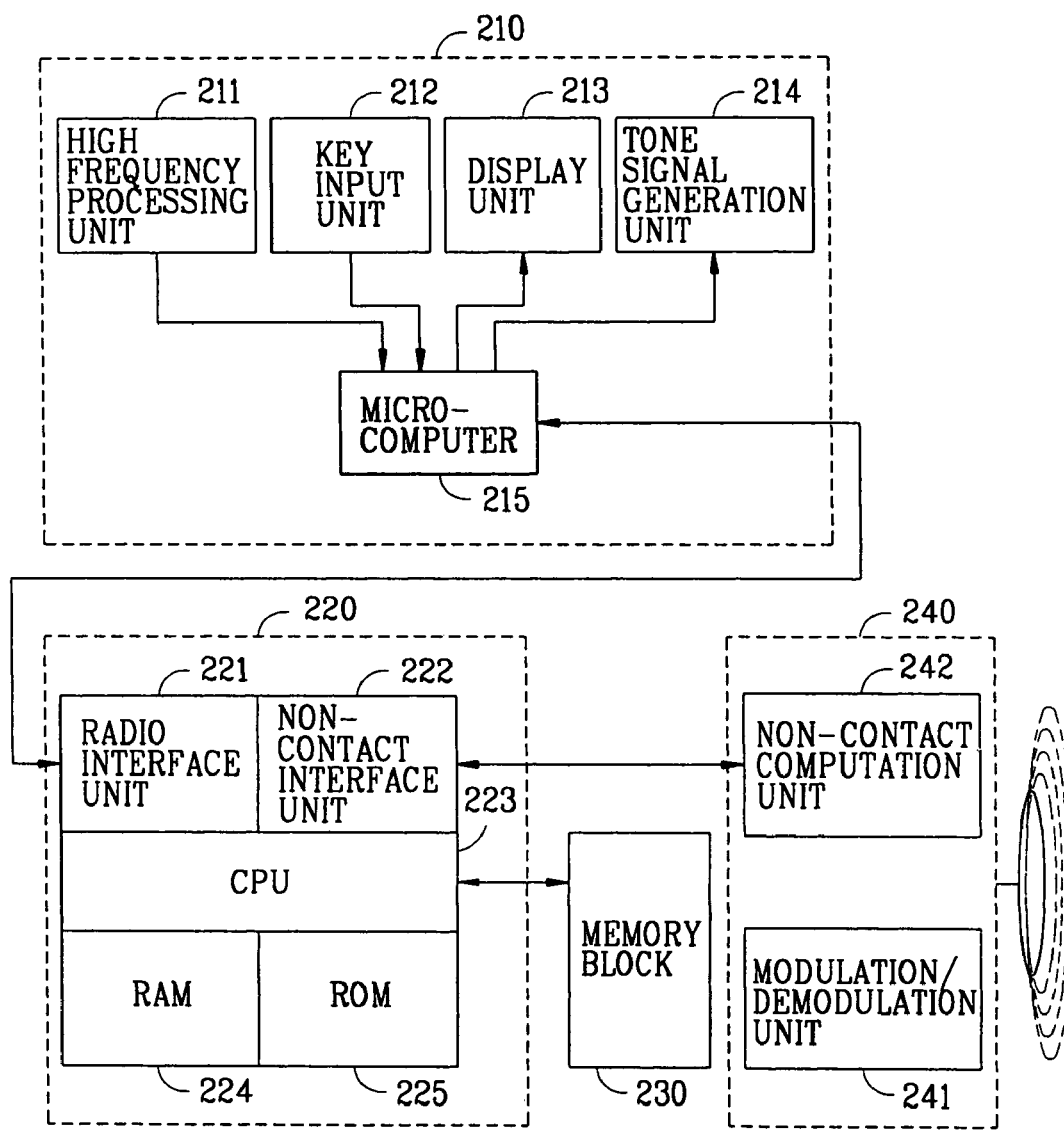
FIG. 1 is a block diagram illustrating an apparatus for storing an electronic money according to a first embodiment of the present invention.

FIG. 1 is a block diagram illustrating an apparatus for storing an electronic money which includes a radio signal receiving block 210 for receiving a radio signal, judging whether the received radio signal corresponds to a general or a balance storing information, displaying the contents of the information when a result of the judgement corresponds to the general information and judging whether a transmission error in the case of the balance storing information, a memory block 230 for storing the storing amount of the money, a computation logic block 220 for comparing serial numbers of the radio signal receiving block 210 in the case of the balance storing information judged by the radio signal receiving block 210, extracting a subscriber key value and balance data through a decryption process of a balance storing information in the case of a coincidence as a result of the comparison, judging whether there is an error, storing the balance data into the memory block 230 when there is not error, reading a storing amount data stored in the memory block 230 in the case of the storing balance content checking signal judged by the radio signal receiving block 210, and transmitting the read data to the radio signal receiving block 210, and a non-contact block 240 for detecting a money storing signal from the card storing unit, converting the thusly detected signal into a certain format and storing the thusly converted signal into the memory block 230.

The radio signal receiving block 210 includes a key input unit 211 for amplifying and decoding a radio signal, a key input unit 212 for inputting a certain key signal, a display unit 213 for displaying a pager information or a balance storing information as a certain character or digit through a decryption process by the computation logic block 220, a tons signal generator 214 for generating a certain sound with respect to the character or digit based on a result of the decryption process in which the computation logic block 220 processes the balance storing information, and a microcomputer 215 for judging an output signal of the high frequency processing unit 211, judging a general information and a balance storing information, transmitting to the display unit 213 in the case of the common radio information, formatting the balance storing information to a certain format corresponding to the computation logic block 220 in the case of the balance storing information, transmitting the formatted information to the computation logic block 220, transmitting the character or digit which are processed via the decryption process to the display unit 213 and a tone signal generator 214, transmitting to the computation logic block 220 when the key signal of the key input unit 212 is judged to be a storing amount content display key signal, receiving the balance storing information and transmitting to the display unit 213.

Figure 2:
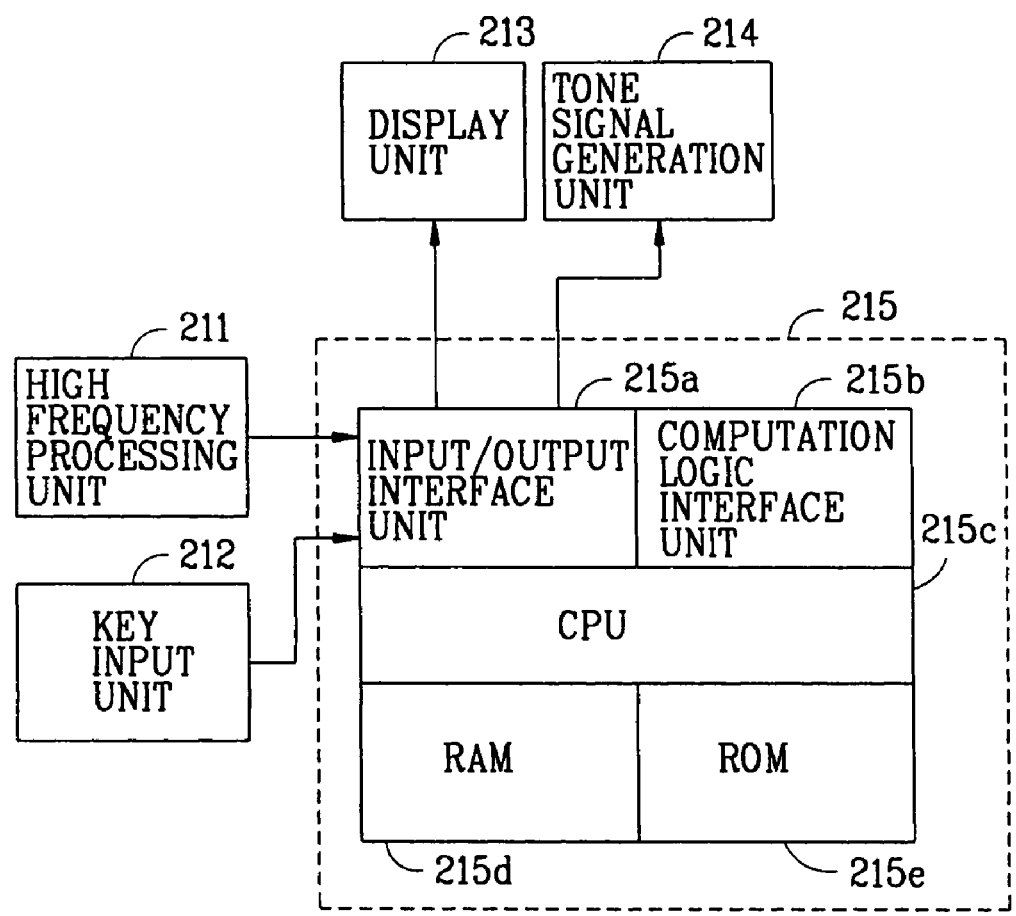
FIG. 2 is a block diagram illustrating a microcomputer of FIG. 1.

As shown in FIG. 2, the microcomputer 215 includes an input/output interface unit 215a for receiving a digital signal converted by the high frequency processing unit 211, a CPU(Central Processing Unit) 215c for judging whether the signal transmitted from the input/output interface unit 215a corresponds to a pager information or a balance storing information, converting into a digit or character in the case of the pager information as a result of the judgement, transmitting to the display unit 213 via the input/output interface unit 215a, formatting the information to a certain format corresponding to the computation logic block 220 in the case of the balance storing information as a result of the judgement, a computation logic interface unit 215b for transmitting the formatted information to the computation logic block 220 in the case that there is not an error as a result of the judgement by the CPU 215c, a ROM(Read Only Memory) 215e including a transmission error judging and signal format program used by the CPU 215c, a program for processing a pager information, and a program for controlling a signal between the computation logic block 220 and the radio signal receiving block 210, and a RAM(Random Access Memory) 215d for storing a computation data of the CPU 215c.

In the first embodiment of the present invention, the computation logic block 220 includes a radio interface unit 221 for transmitting and receiving an information to/from the radio signal receiving block 210, a CPU 223 for comparing serial numbers of the radio signal receiving block inputted into the radio interface unit 221 with a serial number stored in the memory block 230, decrypting the balance storing information in the case of the coincidence as a result of the comparison, extracting a subscriber key value and money amount data, comparing the extracted subscriber key value with a subscriber key value stored in the memory block 230, judging an authorized subscriber, storing the amount data into the memory block 230 in the case of the authorized subscriber, reading the balance storing amount from the memory block 230 when a storing amount content request signal is inputted via the radio interface unit 221 and transmitting to the radio signal receiving block 210 via the radio interface unit 221, a ROM 225 for storing a security program, a balance storing management program, etc. and providing the CPU 223 with the thusly stored programs, and a RAM 224 for storing a computation data of the CPU 223.

The memory block 230 may allocate and store the amount data into a corresponding region, and the amount data may be stored into the same region. The storing amount content and various authorizing information may be allocated to a storing region, and an additional region is allocated to store the storing amount content. In addition, a storing region may be allocated to use a personal information such as an ID card, an electronic ID, etc.

The non-contact block 240 detects a certain frequency signal from the card storing unit and converts the thusly detected signal into a certain format. The thusly converted format signal is transmitted to the memory block 230 for storing a balance of the electronic money. A certain format signal processed through the modulation/demodulation unit 241 of the non-contact block 240 is processed through a balance storing process by the non-contact computation unit 242 for thereby forming a balance data, and the balance data is transmitted to the memory block 230.

Figure 5:
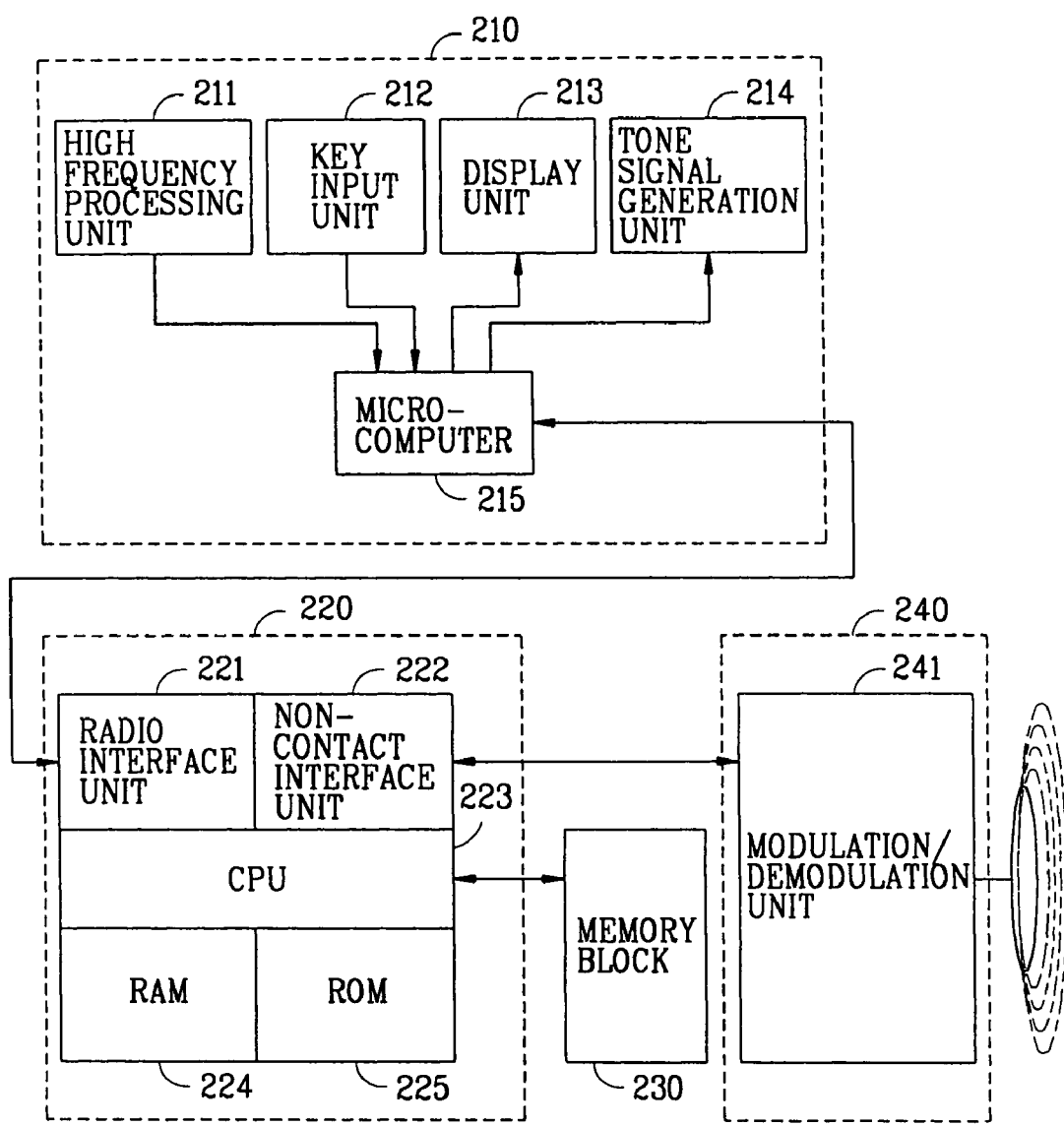
FIG. 5 is a block diagram illustrating an apparatus for storing an electronic money according to a second embodiment of the present invention.

As shown in FIG. 5, in the second embodiment of the present invention, the non-contact computation unit 242 is removed from the block of FIG. 1, and the CPU 223 of the computation logic block 220 performs the function of the non-contact computation unit 242.

In the second embodiment of the present invention, the computation logic block 220 includes a non-contact interface unit 222 for implementing a data transmitting and receiving operation between the CPU 223 and the modulation/demodulation unit 241 of the non-contact block 240, except for the radio interface unit 221, the CPU 223, the RAM 224, and the ROM 225.

In the second embodiment of the present invention, the non-contact block 240 detects a certain frequency signal from the card storing unit, converts the detected signal into a certain format, and the converted format signal is transmitted to the computation logic block 220 for a balance storing operation. The non-contact block 240 transmits th signal formatted by the modulation/demodulation unit 241 to the non-contact interface unit 222 of the computation logic block 220 and stores the balance data into the memory block 230 via the CPU 223 of the computation logic block 220.

The computation logic block 220, the memory block 230 and the non-contact block 240 of the first and second embodiments of the present invention are installed in one IC chip.

Figure 6:
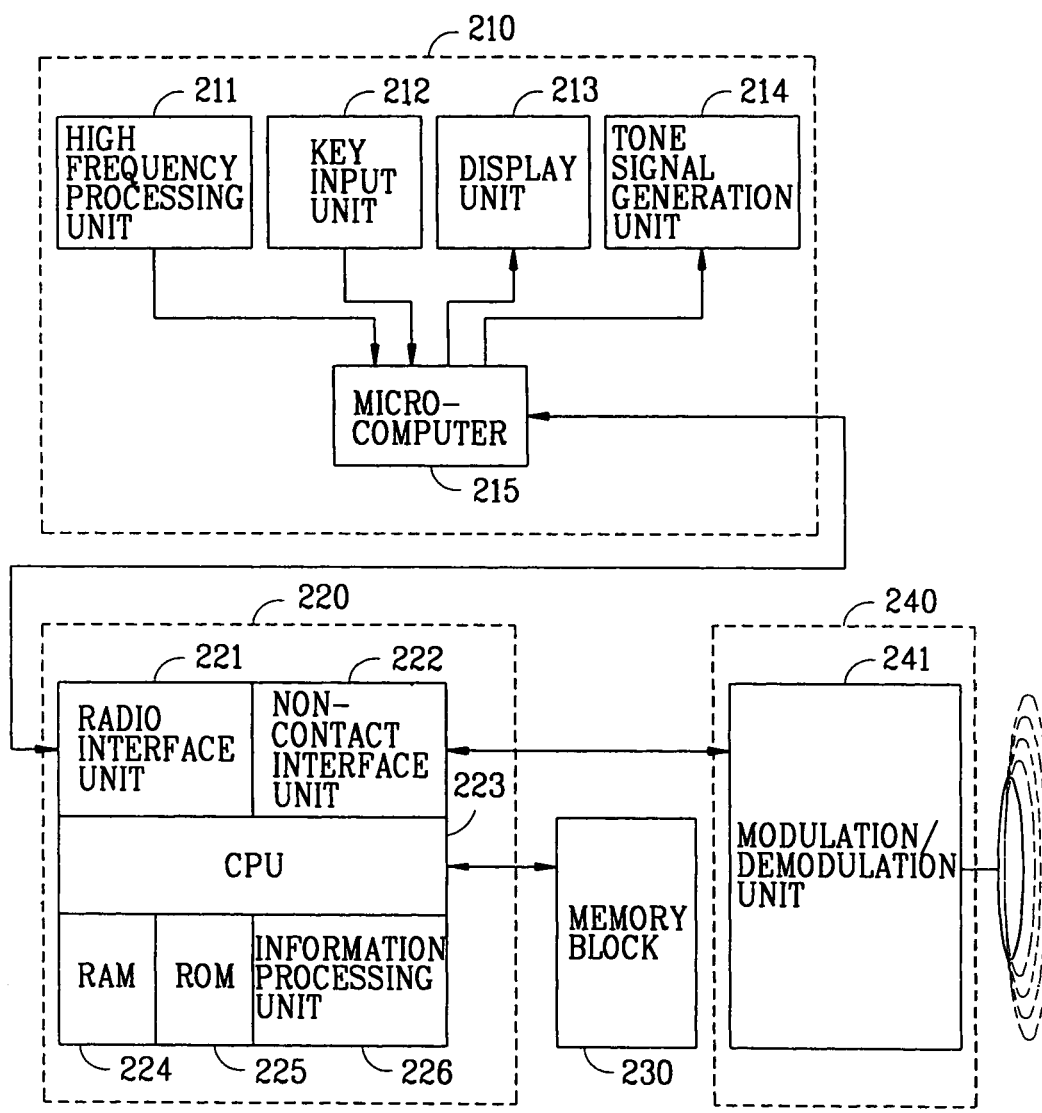
FIG. 6 is a block diagram illustrating an apparatus for storing an electronic money according to a third embodiment of the present invention.
Figure 7A:
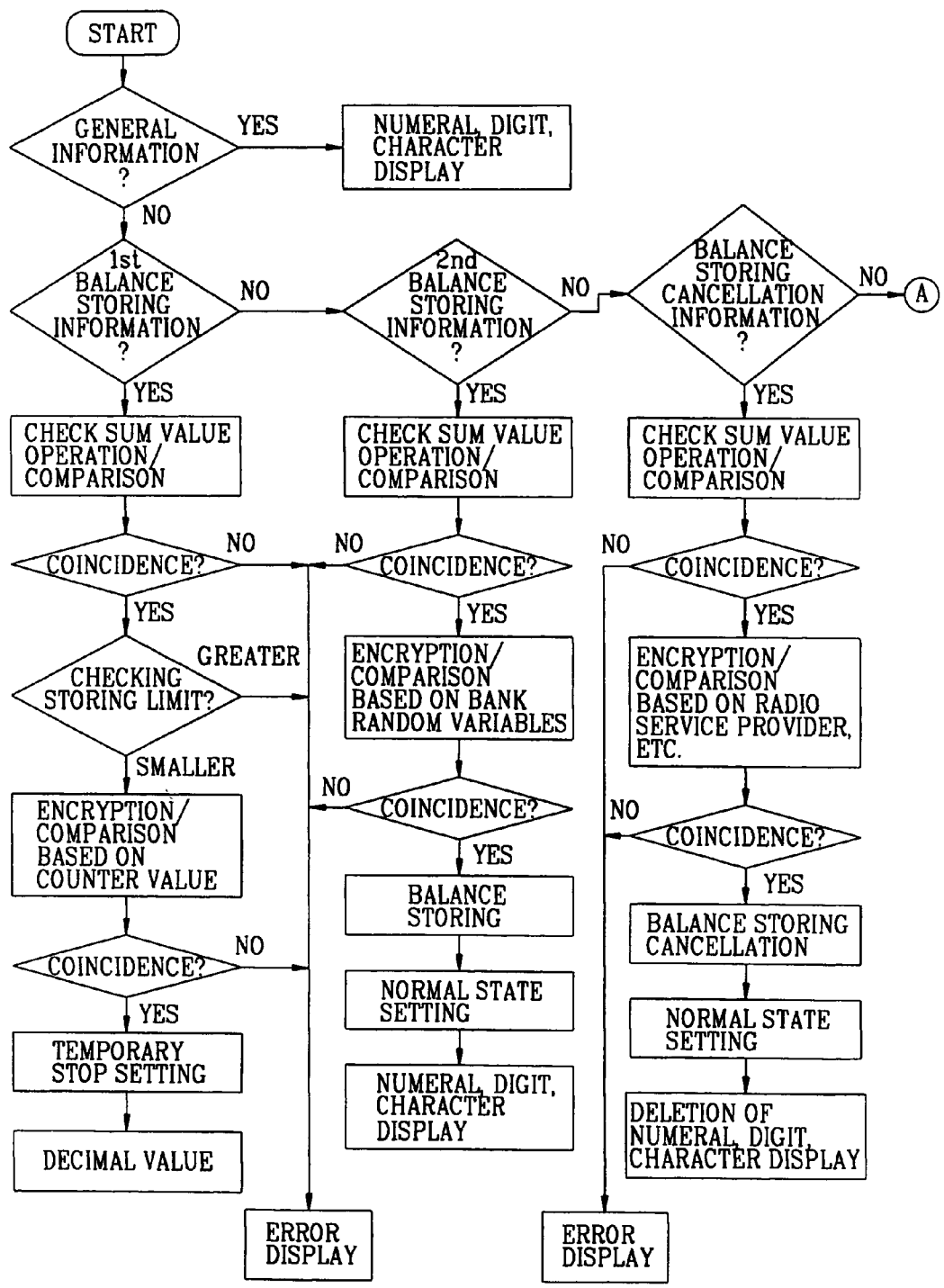

As shown in FIG. 6 of the third embodiment of the present invention, there are provided the radio signal receiving block 220, the computation logic block 220, the memory block 230, and the non-contact block 240. The computation logic block 220 further includes an information processing unit 226 for encrypting an information such as a balance storing, a service stop, a service stop release, a personal information update, etc. and providing the encrypted information to the CPU 223.

The information processing unit 226 may be formed of an additional hardware or may be integrally formed in the CPU 223 as a program.

The operation and effects of the present invention will be explained with reference to the accompanying drawings.

In order to implement the present invention, a radio communication provider provides a money receipt and payment service to a subscriber in connection with a financial service provider.

Figure 3:
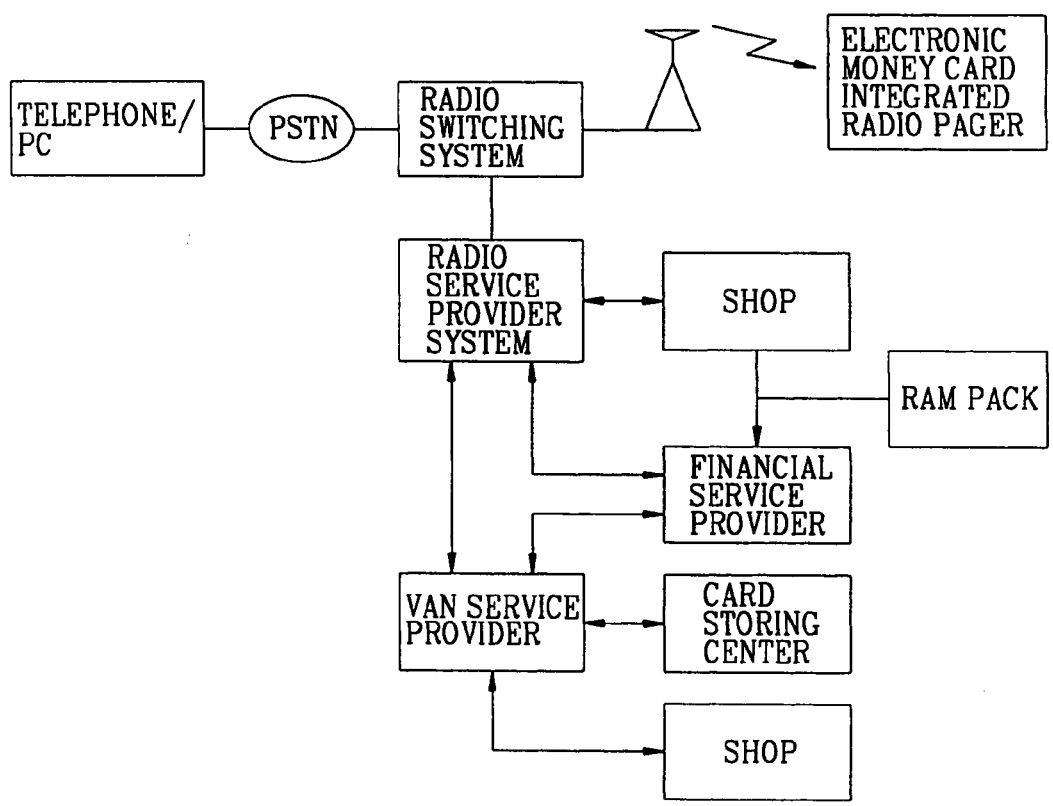
FIG. 3 is a view illustrating a network according to the present invention.

Namely, as shown in FIG. 3, in the construction of the communication network according to the present invention, the radio communication service provider should communicate with a switching station, a financial service provider, a store that accepts a credit card, a credit card service provider, and a value added communication network(VAN). The above-described value added communication network provider should communicate with a card storing center, a store that accepts a credit card, and a financial service provider.

In addition, in order to store a certain amount of the money into an electronic money card using the above-described communication network, the subscriber should make a financial account at a financial service provider which provides a financial service in connection with the radio communication service provider.

The operation that a certain amount of the money is stored into the electronic money card using the communication network will be explained.

First, the subscriber can store a balance of the electronic card connected with the pager device using a personal computer or a telephone based on a radio transmission method.

In the case of the telephone, when a pager device number is called using the telephone, the pager device number is inputted into the radio communication provider via the switching station as a call request signal.

The radio communication service provider judges whether a certain number is available. In the case of the available number, the auto response function is performed, and an auto response voice message is transmitted to the subscriber who made a call, via the switching station in order to request a selection such as a telephone number call, a voice memo, a balance storage, a recharge service, a service stop, a service stop release, a personal information update, etc.

Therefore, assuming that the subscriber stores a balance of the electronic money card, a numeral key or symbol key corresponding to the balance storage is pressed. The thusly pressed key is judged by the radio communication service provider as a balance storing request, and a certain amount of the balance storage is performed based on an auto response function. When the numeral keys corresponding to the amount that the subscriber washes to input are pressed, the thusly pressed keys are detected, and a voice message is transmitted to the subscriber.

Here, in the case of the balance storage, at an initial stage, a password input may be requested, or after the numeral keys corresponding to the amount of the storage may be pressed.

In the case that the subscriber wishes to receive another service, when the subscriber presses a corresponding key, the radio communication service provider system performs an auto response function with respect to a corresponding service.

Therefore, in a new service provider system, a communication service is registered via the value added communication network(VAN) or based on a directly connected financial service provider, so that a search is requested for checking whether there is a certain amount of balance in the account of a corresponding subscriber. If there is a certain amount of money in the account of the subscriber, the pager device of the subscriber is called.

1) The balance storing operation will be explained based on the radio transmission method.

In the first and second embodiments of the present invention, when a call is received from a certain subscriber, in the radio signal receiving block 210, the high frequency processing unit 211 converts the received signal into a digital signal and transmits the converted signal to the microcomputer 215.

At this time, the input/output interface unit 215*a* of the microcomputer 215 receives a digital output signal of the high frequency processing unit 211 and transmits to the CPU 215*c* of the microcomputer 215.

The CPU 215*c* checks whether there is a certain pattern signal for thereby judging whether the signal received corresponds to a general or a balance storing information. In the case of the general information because there is not a certain pattern signal which indicates the balance storing information, the CPU 215*c* converts the signal into a numeral digit or character, and the converted numeral digit or character is transmitted to the display unit 213 via the input/output interface unit 215*a* for thereby informing the subscriber of the call information.

On the contrary, if a certain pattern signal which indicates the balance storing information exists in the pattern of the signal received from the high frequency processing unit 211, and then the pattern signal is judged to correspond to a balance storing information. In this case, the CPU 215*c* formats the information into a certain format corresponding to the computation logic block 220 for thereby judging a transmission error.

At this time, in the case of the transmission error, the CPU 215*c* generates a transmission error signal (for example, "2001") and transmits the transmission error signal to the display unit 213 via the input/output interface 215*a* and transmits a certain sound signal corresponding to the transmission error message to the tone signal generation unit 214, so that the subscriber is informed of the error occurrence.

Therefore, the subscriber hears the voice message provided from the radio communication service provider and sets the retransmission mode, and the radio communication service provider system transmits a balance storing information.

In the case that there is not a transmission error, the CPU 215*c* transmits a balance storing information which is formatted to a certain format to the computation logic block 220 via the computation logic interface unit 215*b*.

At this time, the CPU 223 of the computation logic block 220 compares a serial number of the radio signal receiving block 210 stored in the memory block 230 based on the transmission signal of the radio signal receiving block 210 received via the radio interface unit 221. In the case of the non-coincidence, the CPU 223 invalidates the currently transmitted balance storing information by judging the user as an illegal user.

In addition, when the serial number of the radio signal receiving block 210 is coincided, the CPU 223 judges whether the information corresponds to a balance storing information or a service stop information. In the case of the balance storing information, the counter value contained in the balance storing information transmitted from the radio signal receiving block 210 is read and is compared with a counter value of a function for a decryption.

At this time, when the counter value is not coincided, the CPU 223 generates a counter value error signal (for example, "2004") and informs the display unit 213 and the tone signal generation unit 214 of the radio signal receiving block 210 of the counter value error via the radio interface unit 221.

On the contrary, in the case of the coincidence, the CPU 223 decodes the balance storing information received from the radio signal receiving block 210 as a function of a corresponding counter value based on the counter value for thereby generating a subscriber key value and a balance data and compares whether the above-described subscriber key value with the subscriber key value of the memory block 230.

In the case that the subscriber key value is coincided, the CPU 223 checks the balance storing region of the memory block 230 and sums the current balance and the current amount data, and the summed amount is judged to exceed a certain amount of the money.

If the summed amount is judged to exceed a certain amount of the money, for example, if it is programmed to store up to 990000 won (Korean financial unit) into the memory block 230, the storing amount and the balance stored in the memory block 230 are summed. If the summed amount exceeds 990,000 won, the CPU 223 transmits an overflow signal to the radio signal receiving block 210 via the radios interface unit 221.

The radio signal receiving block 210 receives an overflow signal via the computation logic interface unit 215*b* and transmits the received signal to the display unit 213 via the input/output interface unit 215*a*. At the same time, the tone signal generation unit 214 generates a sound, so that the subscriber is formed of the state that the amount of the money which is stored into the memory block 230 is exceeded.

In addition, if the summed amount is judged to be below a certain amount, the computation logic block 220 compares the value which is obtained by summing the current storing amount and the storing amount corresponding to a predetermined number of communications, with the summed amount contained in the balance storing information transmitted from the radio signal receiving block 210. In the case of the coincidence, the current storing amount is stored into the memory block 230.

A certain number of current balance transmission information and a sequence information are stored into the memory block 230, and the CPU 223 of the computation logic block 220 increases the counter value by 1.

In addition, when receiving and computing a balance storing information, the computation logic block 220 transmits a signal indicating a computation error (for example, "2002") to the radio signal receiving block 210 via the radio interface unit 221 and displays the signal on the display unit 213 for thereby generating a sound message using the tone signal generation unit 214, whereby the subscriber is informed of the computation error.

Namely, in the first and second embodiments of the present invention, the above-described balance storing operation based on a radio communication method is performed.

The balance storing operation according to the third embodiment of the present invention will be explained with reference to the accompanying drawings.

A certain key value provided by the radio communication service provider and a certain key value provided by a financial service provider such as a bank are previously stored in the terminal of the third embodiment of the present invention.

In the third embodiment of the present invention, when buying the terminal, a password is stored therein. The operation of the same will be explained.

A subscriber makes a bank account at a certain financial service provider connected with a radio communication service provider (for example, a bank) via a communication network and buys a terminal having a card which can be restored when there is a balance therein at a radio communication service provider or its agent. At this time, the subscriber informs his bank account to the radio communication service provider or its agent. Thereafter, the radio communication service provider confirms a corresponding terminal serial number and a chip serial number stored in the terminal and registers the same into a radio communication service provider system.

The radio communication service provider confirms whether a bank account is made. In the case that the bank account is made, a certain password registration pattern (for example, "1010") is added to a password of the bank account, and then is transmitted to the subscriber terminal.

At this time, in the terminal of the subscriber, the microcomputer 215 judges that there is no a pager information in the radio signal receiving block 210, and the signal is reformatted based on an ISO standard, and the formatted signal is transmitted to the computation logic block 220.

The computation logic block 220 judges the password number pattern for thereby judging whether there is a transmission error.

In the case of the transmission error, the computation logic block 220 transmits an ISO standard check-sum error message to the radio signal receiving block 210, and the radio signal receiving block 210 transmits the tone signal generation unit 214 as an error sound when the computer 215 displays a transmission error message (for example, "[11]-ERR") on the display unit 213.

Therefore, an information that the password registration is failed is informed to the radio communication service provider, and a retransmission of the password encrypted and provided by the bank is requested.

In the case that there is not a transmission error, in the computation logic block 220, the information processing unit 226 decodes the encrypted password to an original password using a certain key value stored in a certain region of the memory block 230, and the decoded password is stored into a certain region of the memory block 230.

When the computation logic block 220 informs the radio signal receiving block 210 of the truth that the original password is decoded, in the radio signal receiving block 210, the microcomputer 215 displays a character of [OK] on the display unit 213 for thereby implementing a balance storing operation.

When the balance storing operation is started in order to use the electronic money card installed in the terminal, the first and second balance storing signals are received for thereby implementing a balance storing operation. This operation will be explained in detail.

First, a subscriber presses his call number using a PC or a telephone for storing a balance of the electronic money card, and a communication is enabled. Thereafter, the subscriber hears a certain message from the radio communication service provider and then presses a certain numeral digit corresponding to the amount to be stored.

The subscriber inputs his password, inputs a certain amount of electronic money, presses a certain button of the terminal based on a request from the radio communication service provider, so that an encrypted counter value is displayed on the display unit 213, and the displayed counter value is inputted.

The checking operation is performed at the side of the radio communication service provider. At this time, if there is a certain amount of electronic money in the bank account, the encrypted first balance storing information is transmitted. When the first balance storing information is received, in the radio signal receiving block 210, the high frequency processing unit 211 converts the received signal into a digital signal and transmits to the microcomputer 215.

At this time, in the microcomputer 215, when the interface unit 215a transmits a call signal to the CPU 215c, the CPU 215C checks whether there is a certain pattern signal and judges whether the signal is a general information or an information to be transmitted to the computation logic block 220.

Since there is a certain pattern signal, the signal is judged to be an information transmitted to the computation logic block 220, the CPU 215c transmits an information to the computation logic interface unit 215b, and the computation logic interface unit 215b formats the signals based on an ISO-7816 which corresponds to the computation logic block 220 and transmits to the computation logic block 220.

In the computation logic block 220, the radio interface unit 221 receives an information transmitted from the microcomputer 215 and transmits to the CPU 223, and the CPU 223 checks check sum bits and judges whether the signal is properly transmitted.

In the case of the check sum error, the CPU 223 generates a check sum error message and transmits the check sum error message to the microcomputer 215 via the radio interface unit 221.

When the microcomputer 215 receives the check sum error message from the computation logic block 220 via the computation logic interface unit 215b, the CPU 215c judges that there is a transmission error and transmits an instruction to the display unit 213 via the input/output interface unit 215a for indicating that a transmission error is generated.

Therefore, a transmission error message (for example "[11]-ERR") displayed on the display unit 213.

At this time, the subscriber presses a numeral digit of "11" displayed on the displayed on 213 for thereby informing the radio communication service provider of the occurrence of the transmission error and requesting an information retransmission.

In addition, if there is not a check sum error, the computation logic block 220 stores the first balance storing information into a certain region of the memory block 230 as the CPU 223 judges the signal as the first balance storing information.

The CPU 223 extracts an information which does not exceed a certain pattern signal (for example, "1101") from the first balance storing information stored in the memory block 230 and judges the storing request amount transmitted, and sums the balance (radio storage+non-contact storage) in a certain region of the memory block 230 for thereby computing a sum amount.

The CPU 223 judges whether the sum exceeds a storing limit set in a certain region of the memory block 230.

If the sum exceeds a storing limit, the CPU 223 transmits an instruction so that the microcomputer 215 displays an exceeding message for example, "[22]-ERR") on the display unit 213.

The subscriber informs the radio communication service provider of the storing limit exceeding error by pressing the numeral digit "22" displayed on the display unit 213 and displays the balance on the display unit by pressing a certain button, judges a storing request possible amount and inputs the judged amount.

In the case that the sum of the storing request amount and the sum amount does not exceed the storing limit, the CPU 223 formats the storing request amount among the data transmitted, an actual counter value, and a chip serial number of a certain based on a certain format and sets the encrypted key value provided from the radio communication service provider as an encryption key value of the information processing unit 226.

The information processing unit 226 reads and encrypts a value formatted by the CPU 223 and an initial value stored in a certain region of the memory block 230.

Therefore, the CPU 223 compares a certain value of the first balance storing information transmitted via a call with respect to the portion among the result values encrypted by the information processing unit 226.

If the compared values are not coincided, the CPU 223 judges as a certification error and transmits a signal for displaying the certification error message (for example, "[33]-ERR"] on the display unit 213 to thee radio signal receiving block 210.

Thereafter, the subscriber informs the radio communication service provider of the certification error by pressing the numeral digit "33" displayed on the display unit 213 for thereby requesting a re-transmission of the first balance storing information.

If the error occurs during the processing operation, the CPU 223 transmits a signal to the radio signal receiving block 210 in order to display a processing error message (for example, "[44]-ERR") on the display unit 213.

The subscriber informs the radio communication service provider of the processing error by pressing the numeral digit "44" displayed on the display unit 213 for thereby requesting a re-transmission of the first balance storing information.

In addition, if a certain value of the first balance storing information and a certain value are coincided by the information processing unit 226, the CPU 223 formats a bank account password, a storing request amount, and a chip serial number stored in a certain region of the memory block 230 and encrypts the thusly formatted information using a certain key value provided from a bank stored in a certain region of the memory block 230, and a part of the resultant value is processed to a decimal value.

The CPU 223 encrypts a certain numeral digit formatted based on the storing information (storing request amount and a radio communication service provider) transmitted by the wireless method, the chip serial number stored in the memory block 230, and a certain numeral digit changed to the decimal format and computes a part of the resultant value based on the decimal method.

The CPU 223 performs an encryption operation using a certain key value provided from a bank for thereby implementing an encryption using a resultant value converted to a decimal format and a certain key value provided form the radio communication service provider and stores the decimal format resultant value into a certain region of the memory block 230.

The CPU 223 transmits a message that the first balance storing information is successfully encrypted to the CPU 215*c* of the microcomputer 215 via the radio interface unit 221, and the CPU 215*c* transfers an instruction which requests a resultant value to the CPU 223.

The CPU 223 transfers two types of decimal computation values stored in a certain region of the memory block 220 to the microcomputer 215 via the radio interface unit 221.

The CPU 215*c* transmits an instruction to the display unit 213 in order to display a decimal value and an ICON type character which represents an "In charge" at an upper portion or lower portion of the decimal value and transmits an instruction to the tone signal generation unit 214 in order to generate a sound message corresponding to the state message.

Since the first balance storing information is successfully encrypted by the computation logic block 220, the CPU 223 disables the current normal state flat in the region which represents a card state of the memory block 230 and enables a temporary stop flag.

The decimal values displayed on the display unit 213 are displayed until a second balance storing information or storing cancellation information is received. The button operation is disabled.

After a certain time (for example, 1 minute) is elapsed after the message of the "In charge" is displayed on the display unit 213, the message is changed to a message of "Re-charge" by a control of the microcomputer 215, so that the subscriber may receive a second balance charge signal by selecting a recharge mode via a telephone or a personal computer in case that the subscriber falls to receive the second balance change signal.

The subscriber presses the numeral digit displayed on the display unit 213 transmitted from the radio communication service provider, namely, the decimal values are transmitted to the radio communication service provider.

The radio communication service provider performs a certification process with respect to the numeral digits pressed by the subscriber. If it is judged that the numeral digits are not certificated, an auto response voice message is transmitted to the subscriber so that the subscriber re-inputs a corresponding numeral digit.

In the case that the certification process is properly performed with respect to the numeral digits pressed by the subscriber, the second balance storing information is transmitted, and an auto response voice message that the second balance storing information is transmitted is transmitted to the subscriber.

When the subscriber terminal receives the second balance storing information from the radio signal receiving block 210, the high frequency processing unit 211 converts the call signal if to a digital information and transmits to the CPU 215*c* of the microcomputer 215 via the input/output interface unit 215*a*.

The CPU 215*c* judges whether there is a transmission pattern "1010" in order to judge whether the signal corresponds to a common radio information or an information to be transmitted to the computation logic block 220. In the case of the second balance storing signal, the CPU 215*c* formats the information based on the ISO-7816 and transmits to the computation logic block via the computation logic interface unit 215*b*.

In the computation logic block 220, when the information is transmitted from the microcomputer 215 to the CPU 223 via the radio interface unit 221, the CPU 223 checks whether there is a check sum error for thereby judging whether there is a transmission error.

In the case of the transmission error, the CPU 223 displays the transmission error message (for example, "[11]-ERR") on the display unit 213 and transmits an instruction to the microcomputer 215 to generate an error sound via the tone signal generation unit 214. After a certain time of about 10 seconds are elapsed, the decimal values are displayed again on the display unit 213.

In the case that there is not a transmission error, the CPU 223 reads a bit signal below a certain pattern signal "1010" and recognizes as a second balance storing information. Thereafter, the CPU 223 formats a certain variable contained in the second balance storing information, a chip serial number stored in a certain region of the memory block 230, a storing request amount, and a decimal value encrypted to a certain key value provided from the bank, and the information processing unit 226 performs an encryption using a certain key value provided from the bank with respect to the formatted data.

The CPU 223 checks whether the resultant value which is encrypted by the information processing unit 226 is the same as the entire parts or a part of the encryption data contained in the second balance storing information transmitted from the radio communication service provider.

In the case that the values are not same, the CPU 223 transmits an instruction so that the certification error message (for example, [33]-ERR") is displayed on the display unit 213 for a certain time (for example, about 10 seconds).

In the case that the values are same, the CPU 223 stores the storing amount and transmission date into the RAM 224 and sums the balance and storing amount stored in a certain region of the memory block 230, and disables a temporary use stop flag at a certain region of the memory block 230, and enables a normal state flag.

The CPU 223 stores the storing amount and transmission date into the storing amount content checking region allocated in the memory block 230.

Thereafter, the CPU 223 generates a state message which indicates that a certain amount of money is successfully stored and transmits the storing amount and transmission date stored in the RAM 224 and the thusly generated state message to the microcomputer 215.

At this time, in the microcomputer 215, the CPU 215c deletes the decimal value, displays the storing amount and transmission date for a certain time (about 10 seconds), deletes an ICON shape character displayed as an "In charge" or "Reharge", and transmits an instruction for displaying a character of "Completion" for a certain time (about 10 seconds).

Therefore, the subscribed is informed of the state that a certain amount of money is stored.

After the first balance storing process is completed, and the balance storing cancellation call may be implemented during the second balance storing process when a communication is not implemented between the radio communication service provider and the financial service provider (for example, bank), or when the money is withdrawn from the account of the subscriber during the first balance storing process and the second balance storing process, so that there is a certain amount of money in the account of the subscriber. In this case, the subscriber terminal which receives the first balance storing information becomes a temporary stop state.

Therefore, the radio communication service provider transmits a signal for cancelling the first balance storing information in order to release the temporary stop state of the subscriber terminal.

At this time, the subscriber terminal which receives a balance storing cancellation information encrypted by the radio communication service provider performs the same process as the encryption process in the balance storing mode and checks whether there is a transmission error.

If there is a transmission error, the CPU 223 makes the microcomputer to display a transmission error message (for example, "[11]-ERR") on the display unit 213, so that a retransmission is requested to the subscriber.

In addition, if there is not a transmission error, the message is transmitted to the computation logic block 220, and the computation logic block 220 reads the radio communication service provider contained in the balance storing cancellation information received by the CPU 223, the first balance storing information stored in the memory block 230 and the chip serial number, and designates a certain key value of the radio communication service provider as an encryption key value. In this a state, the information processing unit 226 performs an encryption process.

At this time, the CPU 223 compares the resultant value encrypted by the information processing unit 226 with the encryption data contained in the received balance storing cancellation information.

In the case of the non-incidence as a result of the comparison, the CPU 223 transmits an instruction to the microcomputer 215 for displaying a certification error message [33]-ERR) on the display unit 213.

In addition, in the case of the coincidence, the CPU 223 transmits an instruction to the microcomputer 215 for deleting the decimal value displayed on the display unit 213 since the balance storing cancellation process is completed and disables the temporary stop flag of the memory block 230.

In this case, the CPU 223 stores a bale storing cancellation information into a certain region of the memory block 230 for thereby implementing a using state of the subscriber terminal.

The currently transmuted first balance storing information is deleted, and all storing operations are completed.

Thereafter, the subscriber can start the balance storing operation.

Namely, in the present invention, in the case that the first and second balance storing processes are successfully completed, the balance storing cancellation information is not enabled during the counter value encryption process.

In this state, if the balance storing process is performed, the contents of the first and second balance storing signals are stored into a certain region of the memory block 230, and a state message is stored for checking whether only the process result value and the first balance storing call are requested or the second balance storing call is requested or the balance storing cancellation call is received for the reason that when the radio communication service is requested, the contents stored in the terminal are compared for thereby checking the state of the terminal for thereby implementing a full maintenance when there is a certification error or a certain failure.

When storing a certain amount of money, the subscriber presses a certain button of the terminal for thereby displaying the counter value of a certain region of the memory block 230 on the display unit 213. The counter value stored in the memory block 230 is increased when storing a balance into the memory block 230 and when using the stored money.

Namely, when the money is stored based on the radio transmission method or when storing at a common storing center, the computation logic block 220 increases the counter value by "1" stored in the memory block 230.

For example, in the case of the electronic card, the user must pass through the card reader when getting on/off. At this time, the counter value is increased by "2".

If the card reader fails to read the card, the card reader reads the card again. At this case, the counter value is increased by "2".

The counter value is increased by the number that the card reader reads the card until the card reader successfully reads the card.

The thusly increased counter value is provided to the radio communication service provider as a certification value during the balance storing process, so that an information transmission is limited at the radio communication service provider due to the mistake of the subscriber.

The counter value are encrypted and displayed on the display unit 213. The encryption process will be explained.

First, when a subscriber presses a certain button of the key input unit 212 of the terminal to check the counter value in when storing the balance based on the radio transmission method, the counter value request instruction is transmitted to the CPU 215c of the microcomputer 215.

At this time, when the CPU 215c informs the state that the counter value request instruction is inputted, to the computation logic block 220, the computation logic block 220 reads 16-digit counter value and changes to 2-digit value stored in the memory block 230. The resultant values are divided into a certain number of groups, and then a 2-digit sum is performed between each group.

The CPU 223 sums the resultant value obtained from a part of the 2-digit result value (or from the entire portions of the same) and a bit which indicates whether a balance storing cancellation call is received (for example, in the case that the call is received, it represents "1" and in the case that the call is not received, it represents "0". The resultant values and a part of the chip serial number stored in the memory block 230 or a part of the initial values of the encryption are logically processed, and the 2-digit value of the resultant value is computed based on the decimal method.

At this time, when the CPU 223 transmits a decimal value to the microcomputer 215, the CPU 215c displays on the display unit 213.

Therefore, the subscriber transmits the counter value displayed on the display unit 213 to the radio communication service provider in the balance storing mode for implementing a certification operation.

2) The balance storing operation based on the storing unit according to the present invention will be explained.

First, the portable terminal is placed at a height of the card storing unit and pays a certain amount of the money. The amount of the money corresponding to the amount that the user wishes to store is inputted for thereby performing a storing operation.

At this time, the card storing unit checks whether the storing service is available based on a certifying process.

If the storing operation is available, the card storing unit generates a signal corresponding to the storing amount, and the non-contact block 240 stores the storing amount data detected by the modulation/demodulation unit 241 into the memory block 230.

The storing process is different from the embodiments based on whether there is a non-contact computation unit 242 in the non-contact block 240.

In the first embodiment, in the case that there is not the non-contact computation unit 242, the non contact unit 242 stores a storing amount data into the memory block 230.

In the second and third embodiments, in the case that there is not the non-contact computation unit 242, the storing data is stored into the memory block 230 via the non-contact interface unit 222 and the CPU 223 of the computation logic block 220.

When the storing operation is completed, and then the user presses a storing amount certification button on the terminal, the microcomputer 215 transmits the completion state to the computation logic block 220.

The computation logic block 220 reads the sum and storing contents based on the radio or storing unit from the memory block 230 and transmits to the radio signal receiving block 210.

In the radio signal receiving block 210, the microcomputer 215 displays the storing amount information transmitted from the computation logic block 220 on the display unit 213 for thereby informing the current stored amount and the storing amount contents.

3) A certain amount of the electronic card money integrally engaged with the portable terminal is stored through the above-described operation. The use of the stored electronic money card will be explained.

First, when a user contacts the portable pager device with the electronic money card to the card reader for paying a traffic fare or a certain product, the signals corresponding to the kind of the card, the certification key value of the card, the payment data and certification signal, etc. are communicated between the card reader and the portable pager device for thereby implementing a payment process.

At this time, the payment process is different from the first, second and third embodiment of the present invention based on whether there is a non-contact computation unit 242 of the non-contact block 240.

In the first embodiment of the present invention, in the case that there is the non-contact computation unit 242, the non-contact computation unit 242 reads the amount data from the memory block 230 and transmits the amount data as much as the payment amount to the card reader via the modulation and demodulation unit 241 of the non-contact block 240 for thereby implementing a payment.

In the second and third embodiments of the present invention, in the case that there is not the non-contact computation unit 242, the amount data as much as the payment amount is transmitted from the amount data storing region of the memory block 230 to the modulation and demodulation unit 241 of the non-contact block 240 via the CPU 223 of the computation logic block 220 for thereby implementing a payment.

4) The storing contents and balance checking operations of the first through third embodiments of the present invention are same. The above-described operation will be explained.

In order to check the current balance, when a user presses a certain button of the pager device, the radio signal receiving block 210 judges the pressed state and transmits the pressed state to the computation logic block 220.

The computation logic block 220 checks the memory block 230 and reads the amount data stored and transmits to the radio signal receiving block 210.

In the radio signal receiving block 210, the microcomputer 212 displays the current balance transmitted from the computation logic block 220 on the display unit 213.

In order to check the stored amount contents, when the user presses a certain button of the key input unit 212 of the pager device, in the radio signal receiving block 210, the CPU 215 judges the pressed state and transmits to the computation logic block 220.

The CPU 223 of the computation logic block 220 reads the sequence information and storing amount from the memory block 230 and transmits to the radio signal receiving block 210.

The microcomputer 215 of the radio signal receiving block 210 sequentially displays the storing amount information transmitted from the computation logic block 220 on the display unit 213.

In another embodiment of the present invention, the service stop may be set when the user loses the terminal. If found, the service stop release may be implemented.

5) The "service stop" process will be explained.

When a subscriber makes a call to his call number, the call is inputted as a call request signal at the radio communication service system via a switching station.

At this time, the radio communication service provider transmits a voice message to the subscriber via the switching station in order to request a selection such as a telephone call, a voice memo, a storing service, a recharge service, a service stop, a service stop release, etc.

Therefore, the subscriber presses a numeral key corresponding to the service stop. The radio communication service provider system receives the service stop and requests the subscriber to input his password. When the subscriber inputs the password, the thusly inputted password is compared with the stored password. In the case of the coincidence, the radio communication service system calls a service stop signal to a corresponding pager device via the switching station.

At this time, in the pager device of the subscriber, the radio signal receiving block 210 converts the signal inputted from the radio communication service provider system into amplified and digital signal by the high frequency processing unit 211 and is transmitted to the CPU 215*c* via the input/output interface unit 215*a*.

When the CPU 215*c* judges the service stop signal, the CPU 215*c* formats the service stop signal into a certain format corresponding to the computation logic block 220 and transmits the formatted signal to the computation logic block 220 via the computation logic interface unit 215*b*.

In the computation logic block 220, the CPU 223 extracts a serial number of the radio signal receiving block 210 from the transmission signal at the radio signal receiving block 210 received via the radio interface unit 221 and compares the thusly extracted number with a serial number stored in the memory block 230. In the case of the coincidence, the balance storing information is controlled not to be transmitted.

In the first embodiment of the present invention, the computation logic block 220 disables the operation of the memory block 230, and in the second embodiment of the present invention, the computation logic block 220 disables the operation of the memory block 230 and controls the non-contact block 240 for thereby stopping the function of the modulation and demodulation unit 241.

Therefore, the service of the electronic money card engaged in the pager device is stopped based on the above-described operation.

Figure 4:
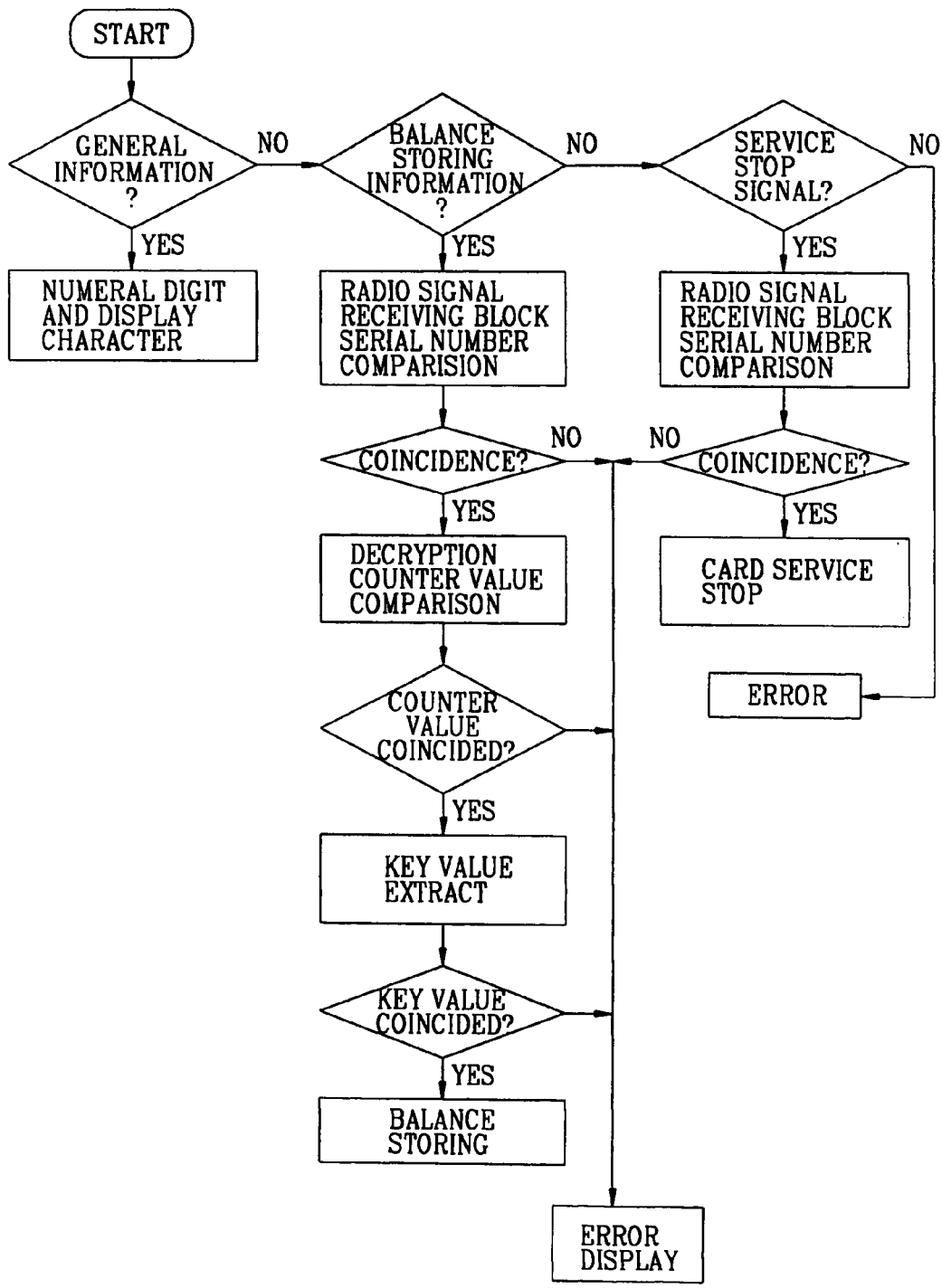
FIG. 4 is a flow chart illustrating a method for storing an electronic money.

The above-descried operation is performed based on the flow of signals as shown in FIG. 4. This will be explained as follows.

When a radio signal is inputted, it is judged whether the signal corresponds to a common call information or a balance storing information by the radio signal receiving block 210.

At this time, in the case of the balance storing information, the radio signal receiving block 210 formats the balance storing information into a certain format and transmits to the computation logic block 220. The CPU 223 decrypts the information and extracts a serial number of the radio signal receiving block and a subscriber key value.

The CPU 223 compares the decrypted serial number of the radio signal receiving block with a serial number of the radio signal receiving block stored in the memory block 230. In the case of the coincidence, the decrypted subscriber key value and the subscriber key value stored in the memory block 230 are compared. In the case of the coincidence, the operation is judged to be a proper balance storing operation for thereby storing a certain amount of money into the memory block 230.

If the received radio signal is judged to be a service stop signal, the radio signal receiving block 210 formats the signals and transmits to the computation logic block 220.

At this time, in the computation logic block 223, the transmitted signal is decrypted, and a serial number of the radio signal receiving block 210 is extracted, and the extracted serial number is compared with the serial number stored in the memory block 230.

In the case of the coincidence, the CPU 223 judges the service stop signal and disables the memory block 230 and stops the function of the modulation and demodulation unit 241 by controlling the non-contact block 240 for thereby stopping the service of the electronic money card.

The service stop process according to the third embodiment of the present invention will be explained.

First, the radio communication service provider which receives the service stop request judges a proper subscriber passed through the certification process and transmits an encryption value containing a service stop pattern, an encryption value, a certain variable, and a transmission data is transmitted together with the check sum information as a service stop information.

At this time, the subscriber terminal receives a service stop information that the radio signal receiving block 210 transmits at the side of the radio communication service provider and transmits to the computation logic block 220. The CPU 223 extract a certain variable and compares with a certain variable contained in the previous service stop information stored in the memory block 230.

If the currently transmitted radio communication service provider variable is tin the same as or is smaller than the variable of the previously transmitted radio communication service provider, the CPU 223 judges the signal to be not a proper signal and does not set the service stop state of the terminal and transmits an instruction to the microcomputer 215 for displaying a certification error message ([33]-ERR) on the display unit 213.

On the contrary, if the currently transmitted variable is greater than the previously transmitted variable, the CPU 223 formats the chip serial number contained in the memory block 230 and the variables and transmission date contained in the service stop information, and the information processing unit 226 encrypts the formatted data using a certain key value provided from the radio communication service provider.

At this time, the CPU 223 compares the encryption value contained in the service stop information with a part of the entire parts of the result value processed by the information processing unit 226.

In the case of the non-coincidence, the CPU 223 transmits an instruction to the microcomputer 215 to display a certification error message of [33]-ERR on the display unit 213.

On the contrary, in the case of the encryption value coincidence, the CPU 223 enables the service stop flag contained in the memory block 230 and stores the service stop information and the service stop information processing result value into the memory block 230 and transmits a result of the process to the microcomputer 215.

The microcomputer 215 transmits an instruction to the display unit 213 to display a "Stop" character of an ion shape.

Therefore, the service of the terminal is stopped by the above-described operation.

6) In the case that the terminal is lost, the service stop of the terminal must be requested. First, in the first and second embodiments of the present invention, a communication is connected with the radio communication service provider side. A numeral key corresponding to the service stop release is pressed. The radio communication service provider which judges a service stop release requests a user to input a password. In the case that the inputted password is coincided with the stored password, the radio communication service provider transmits a service stop release information to a corresponding pager device.

At this time, in the subscriber terminal, the radio signal receiving block 210 converts the signal from the radio communication service provider into an amplified and digital signal by the high frequency processing unit 211 and transmits to the CPU 215c via the input/output interface unit 215a of the microcomputer 215.

The CPU 15c formats a service stop signal into a format corresponding to computation logic block 220 and transmits to the computation logic block 220 via the computation logic interface unit 215b.

In the computation logic block 220, the CPU 233 extracts a serial number of the radio signal receiving block 210 from a transmission signal from the radio signal receiving block 210 received via the radio interface unit 221 and compares the extracted serial number with a serial number stored in the memory block 230.

In the case of the coincidence, the CPU 223 controls the memory block 230 or the non-contact block 240 for implementing a transmission of a balance storing information.

Namely, in the first embodiment of the present invention, the computation logic block 220 enables the operation of the memory block 230, and in the second embodiment of the present invention, the computation logic block 220 enables the memory block 230 and the modulation and demodulation block 241 of the non-contact block 240.

Therefore, the service stop of the electronic money card engaged in the pager device is released by the above-described operation.

In the third embodiment of the present invention, at the radio communication service provider, when a service stop release is requested from a proper user, in the case that is judged as a proper user via a certification process, a service stop release information containing a service stop release pattern, a certain variable, an encrypted value, and a transmission date is transmitted.

In the subscriber terminal which receives a service stop release information transmitted from the radio communication service provider side, the CPU 223 of the computation logic block 220 compares a certain variable contained in the previous service stop release information stored in the memory block 230 with a certain variable contained in the currently transmitted service stop release information.

Therefore, in the case that the currently transmitted variable is greater than the variable contained in the service stop release information, the CPU 223 performs the same service stop release as the service stop setting process.

However, in the case of the service stop release, the CPU 223 disables the service stop flag of the memory block 230 and enables the normal state flag and transmits an instruction to the microcomputer 215 for deleting the character of "Stop" displayed on the display unit 213.

Therefore, the subscriber terminal becomes available.

In the third embodiment of the present invention, in the case that the service stop or service stop release information is first received, since there is not a radio communication service provider in the memory block 230, the service stop or service stop release of the terminal is set using the current certain variable value transmitted from the radio communication service provider.

At this time, a result value of the service stop or service stop release process is stored into the memory block 230 in order to prevent the service stop or service stop release from being set when the previously used service stop or service stop release information is re-transmitted.

If it is impossible to find the lost terminal, the user visits the radio communication service provider and stops the service of the terminal. If the user wishes a balance storing service, a new terminal is obtained and registered.

7) In the case of the registration and updates of the personal information, in the first and second embodiment of the present invention, the operation is implemented similarly to the service stop operation. In the case that the comparison results of the serial numbers are same, the CPU 223 updates the personal information stored in the region of the memory block 230 with the currently transmitted information.

In the third embodiment of the present invention, the operation is implemented similarly to the service stop operation. In the case that the check sums are coincided, the CPU 223 updates the personal information stored in the region of the memory block using the data decoded by the information processing unit 226.

8) In the third embodiment of the present invention, a coding or decoding operation is implemented with respect to the information transmitted from the radio communication service provider when performing the process such as a balance storing operation, a recharge service, a service stop and release, a personal information update, etc. In this case, an algorithm such as "Triple DES" may be adapted.

The triple DES algorithm is a coding or decoding technique using the DES algorithm three times and a technique for coding or decoding the data using a certain key value.

Figure 8A:
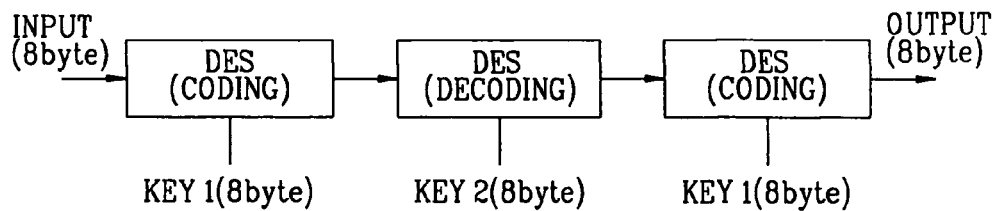
FIGS. 8 and 9 are views illustrating an encryption/decryption mechanism according to a third embodiment of the present invention.
Figure 8B:
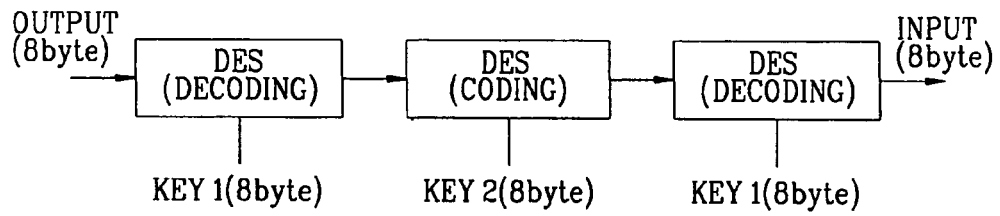

Therefore, in the case of the password registration and personal information update, when the encryption is implemented at the side of the radio communication service provider as shown in FIG. 8A, the decoding operation is performed at the subscriber terminal as shown in FIG. 8B.

Figure 9A:
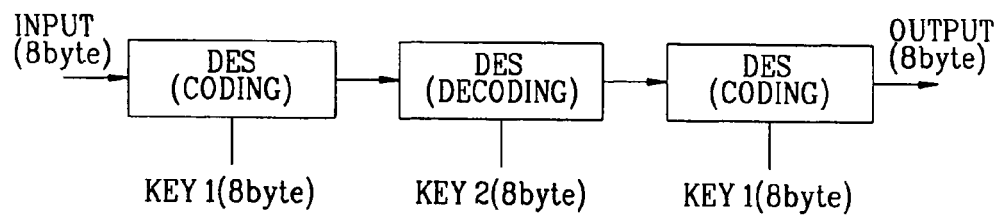
Figure 9B:
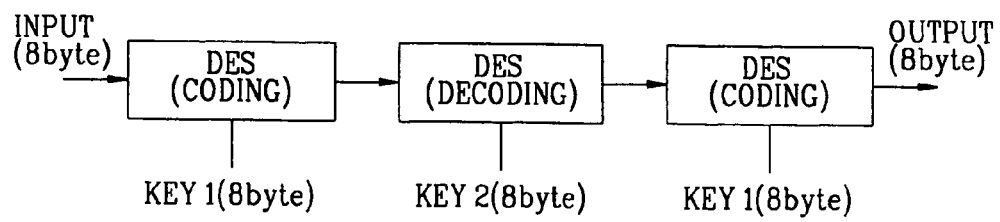

In the case of a balance storage, a service stop, and a service stop release, when the encryption is implemented at the side of the radio communication service provider as shown in FIG. 9A, the encryption is performed at the subscriber terminal as shown in FIG. 9B, so that a corresponding operation is performed using a result of the process.

As described above, in the present invention, since it is possible to store a balance of the electronic money card based on a balance storing unit as well as a radio transmission method, it is possible to remove any inconvenience which is caused when a user directly visits the storing center or shop in order to store a balance of the electronic money card.

In addition, in the present invention, of the card is lost, since it is possible to set the service stop based on a radio transmission method, it is possible to prevent a financial loss due to the lost card.

Furthermore, in the present invention, it is possible to implement a balance storing operation, a service stop and a personal information changing operation.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. An apparatus for storing electronic money, comprising:
   a radio signal receiving block for receiving a radio signal and determining whether the received signal corresponds to a general information or balance storing information;
   a memory block for storing a storing amount, a content and certification information;

a computation logic block for comparing a serial number extracted from the received signal with a previously stored serial number if it is determined that the received signal corresponds to balance storing information, and storing balance storing data extracted from the balance storing information into the memory block if the extracted serial number and the previously stored serial number are determined to be the same and the balance storing information transmitted from the radio signal receiving block is determined to be a proper signal; and a non-contact block for storing a balance storing amount into the memory block using a card storing unit and reading a balance storing amount of the memory block when paying the money.

2. The apparatus of claim 1, wherein said computation logic block is designed so that a certain amount of data is stored into the memory block only when first and second balance storing information are all received from the radio signal receiving block.

3. The apparatus of claim 1, wherein said radio signal receiving block includes:

a key input unit for inputting a certain key signal;

a display unit for displaying general information or balance storing information as a character or digit;

a control means for decrypting an output signal of the high frequency processing unit, transmitting to the display unit, transmitting to the computation block if the information is balance storing information or is a balance storing content check key signal from the key input unit, receiving balance storing content information and displaying the same on the display unit; and a tone signal generator for generating a call sound or an error sound during the balance storing operation by the control means.

4. The apparatus of claim 3, wherein said control means is designed to check whether there is a certain pattern signal in an output signal of the high frequency processing unit, determine whether the information corresponds to a common radio information or a balance storing information, format the information into a certain format corresponding to the computation logic block when there is a certain pattern signal, determine whether there is an error signal, and transmit the formatted information to the computation logic block when there is no transmission error.

5. The apparatus of claim 1, wherein said non-contact block includes:

a modulation and demodulation unit for preparing a signal transmitting and receiving operation with a card storing unit or a card reader; and a non-contact computation unit for storing balance storing data into the memory block at the modulation and demodulation unit if the received signal corresponds to balance storing information, reading the balance storing data stored in the memory block if money is paid and transmitting the read data to the modulation and demodulation.

6. The apparatus of claim 1, wherein said computation logic block includes:

control means for summing the balance of the memory block and the balance storing amount if certification information is extracted during the balance storing operation and the previously stored various certification information is the same as the extracted certification information, for thereby determining whether a subscriber is a proper subscriber, storing the balance storing data into the memory block when a summed amount is below a certain amount and transmitting data to a radio signal receiving block in order to generate an error and error sound when the summed amount exceeds the certain amount; and a radio interface unit for implementing a data transmitting and receiving operation between the radio signal receiving block and the control means.

7. The apparatus of claim 6, wherein said control means is designed to decrypt an output signal of the radio signal receiving block, extract certification information if there is a service stop signal, disables the memory block when the extracted certification information is the same as the previously stored certification information, and stop the service of the card.

8. An apparatus for storing an electronic money, comprising:

a radio signal receiving block for receiving a radio signal, determining whether the received radio signal corresponds to general information or balance storing information;

a memory block for storing a storing amount, a content, and certification information;

a modulation and demodulation unit for implementing a signal transmitting and receiving operation with a card storing unit; and a computation logic block for comparing a serial number extracted from the received signal with a previously stored serial number if it is determined that the received signal corresponds to balance storing information, and storing the balance storing information into the memory block if the extracted serial number and the previously stored serial number are determined to be the same and the various certification information extracted from a the balance storing information transmitted from the radio signal receiving block during the balance storing operation are determined to be proper information, storing the balance storing data of the modulation and demodulation unit into the memory block and reading the amount data up to the amount confirmed by the modulation and demodulation unit during the payment operation from the memory block and paying via the modulation and demodulation unit.

9. The apparatus of claim 8, wherein said computation logic block is designed to receive first and second balance storing information from the radio signal receiving block and store the amount data into the memory block only when the balance storing information is determined to be proper information.

10. The apparatus of claim 8, wherein said computation logic block is designed to stop the service of the terminal when proper first balance storing information is received from the radio signal receiving block.

11. The apparatus of claim 10, wherein said computation logic block is designed to release a temporary service stop state of the terminal when balance storing cancellation information is received from the radio signal receiving block during the balance storing operation.

12. The apparatus of claim 8, wherein said computation logic block includes:

control means for decrypting balance storing information based on a radio transmission method, storing the balance storing data into the memory block if the subscriber is determined to be a proper subscriber, storing the balance storing data based on a non-contact method, reading the amount data up to the amount confirmed during the payment and transmitting via the non-contact interface unit;

a radio interface unit for implementing a data transmitting and receiving operation with the control means; and a non-contact interface unit for implementing a signal transmitting and receiving operation between the modulation and demodulation unit and the control means.

13. The apparatus of claim 12, wherein said control means is designed to disable the operation of the memory block if an output signal from the radio signal receiving block is determined to be a proper service stop signal, and stop the operation of the modulation and demodulation unit for thereby stopping the service of the card.

14. An apparatus for storing electronic money wherein the apparatus is engaged with a portable terminal and an electronic money card, comprising:

high frequency processing means for receiving a radio signal and converting the received radio signal into a digital signal;

modulation and demodulation means for implementing a signal transmitting and receiving operation with a card storing unit or a card reader;

a memory block for storing a storing amount, a content and certification information; and control means for receiving an output signal from the high frequency processing means, determining whether output signal corresponds to a general information or a balance storing information, storing the balance storing data into the memory block when a serial number extracted from the radio signal and the previously stored serial number are determined to be the same and various certification information extracted from the amount information are determined to be the same as previously stored various certification information if the received signal contains balance storing information, checking the balance storing data inputted from the modulation and demodulation means, storing the amount into the memory block, reading an amount of money up to an amount confirmed by the modulation and demodulation during the payment operation and then paying the money.

15. A method for storing electronic money using a radio communication and a card storing unit, comprising:

providing a device for automatically determining whether a received radio signal corresponds to general information or balance storing information;

extracting various certification information including amount information and a radio receiving block serial number if the received radio signal is determined to correspond to balance storing information, and determining whether the extracted serial number is the same as a previously stored serial number and whether a subscriber is a proper subscriber;

storing the amount information extracted from the balance storing information if the extracted serial number and the previously stored serial number are determined to be the same and the subscriber is determined to be a proper subscriber; and displaying the current storing amount and the storing amount contents when the balance storing data is stored.

16. The method of claim 15, wherein in said step for determining the balance storing information, the information is determined to be a balance storing information when there is a certain pattern signal in the received radio signal.

17. The method of claim 15, wherein said step for extracting various certification information includes:

reading a counter value contained in the balance storing information if it is determined that the serial numbers are the same and determining whether the read counter value is the same as a counter value of a function for the previously stored encryption;

determining whether the serial key value outputted via the encryption process in which the counter values are coincided is the same as a previously stored key value; and determining that a subscriber is a proper subscriber when the key values are the same.

18. The method of claim 17, wherein said decryption process of the balance storing information is implemented when the counter value extracted from the balance storing information is the same as the counter value for the previously stored decryption.

19. The method of claim 15, wherein said step for storing the amount information includes:

summing a current balance storing amount and a recent radio balance storing amount to obtain a first summed amount if the subscriber is a proper subscriber and determining whether the first summed amount is below a certain amount;

determining whether the first summed amount equal to a second summed amount contained in the balance storing information based on the radio transmission method if the first summed amount is below a the certain amount;

storing the balance storing data if the first summed amount is equal to the second summed amount; and determining the signal as a balance storing error if the first summed amount is greater than a the certain amount or the first summed amount is not equal to the second summed amount.

20. A method for storing electronic money using radio communication and a storing unit, comprising:

determining whether received balance storing information corresponds to first balance storing information;

determining whether the received balance storing information is a proper signal by performing a certification of the first balance storing information if it is determined that the received balance storing information corresponds to the first balance storing information;

setting a temporary service stop state if it is determined that the received balance storing information is a proper signal and waiting to receive second balance storing information;

performing a certification of the second balance storing information when the second balance storing information is received and determining whether the second balance storing information is a proper signal;

wherein said certification step includes:

extracting the storing request amount from the first balance storing information, summing the thusly extracted amount and the balance, and determining whether the summed amount is greater than the storing limit amount;

encrypting the value as a certain key value when the summed amount is the same or is smaller than the storing limit amount and determining whether the value equals the value extracted from the first balance storing information, said certain key value is provided from a second certification and not from a radio communication service provider and said certain key value is previously stored; and encrypting the first balance storing information as a certain key value when the encrypted value is equal to the extracted value and changing to a decimal value and displaying the decimal value;

formatting the data contained in the second balance storing information and encrypting using a certain key value of the certification provider;
determining whether the encrypted value is equal to an encrypted value contained in the second balance storing information; and
determining that the signal is a proper signal if the encrypted values are equal;
wherein said encryption step is performed using a certain key value provided from the first and second certification providers;

storing a request amount if it is determined that the second balance storing information is a proper signal and implementing an available state of the card;
completing balance storing operation when proper balance storing cancellation information is received after the first balance storing information is received; and
displaying balance storing information.

\* \* \* \* \*